United States Patent
Eruhimov

(10) Patent No.: US 7,319,993 B2
(45) Date of Patent: Jan. 15, 2008

(54) AUTOMATICALLY GENERATING A PATH TO AN ITEM DEPENDING ON ITS ACCESS HISTORY

(75) Inventor: Victor Eruhimov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 880 days.

(21) Appl. No.: 10/423,307

(22) Filed: Apr. 25, 2003

(65) Prior Publication Data

US 2004/0215591 A1    Oct. 28, 2004

(51) Int. Cl.
*G06F 17/30* (2006.01)

(52) U.S. Cl. ............................................ 707/1; 706/11

(58) Field of Classification Search ................... 707/1; 706/11
See application file for complete search history.

(56) References Cited

U.S. PATENT DOCUMENTS

| | | | |
|---|---|---|---|
| 5,301,314 A * | 4/1994 | Gifford et al. ............... 707/101 |
| 6,233,570 B1 * | 5/2001 | Horvitz et al. ................. 706/11 |
| 2003/0050906 A1 * | 3/2003 | Clifton-Bligh ................. 707/1 |

* cited by examiner

*Primary Examiner*—John Breene
*Assistant Examiner*—Dennis Myint
(74) *Attorney, Agent, or Firm*—Trop, Pruner & Hu, P.C.

(57) ABSTRACT

A device or software may detect a number of times an item is accessed. A more direct path to the item may be automatically generated. The more direct path may be based at least in part on how often the item is accessed.

27 Claims, 6 Drawing Sheets

AUTOMATICALLY GENERATING A PATH TO AN ITEM DEPENDING ON ITS ACCESS HISTORY

BACKGROUND

This invention relates generally to a hierarchically implemented data structure.

The functionality of many electronic devices has become so great that accessing data within the devices is sometimes quite cumbersome. Some electronic devices, therefore, have a structure that allows information to be accessed by navigating a series of levels until the desired item is found. Such a structure is often arranged in a hierarchical fashion. For instance, a user may begin at the top-most level, generally referred to as the root level, and navigate downwardly through the levels until the desired item is found.

Navigating through multiple levels to find an item may take a long time. In some cases, this has prompted users to manually create an alternate path through which to access the item, so that the item may be accessed more quickly. For example, a user may manually create a shortcut to the item. In some cases, a shortcut may allow access to an item at a higher level of the hierarchical structure than the level at which the item was accessed before the shortcut was created. A shortcut may be desired, for example, to facilitate accessing frequently accessed items and items having a long access path (i.e., items buried deep within the hierarchical structure). However, a user is required to dedicate time to manually create these shortcuts.

Thus, there is a need for an improved way of generating a path to an item.

DETAILED DESCRIPTION

Figure 1:
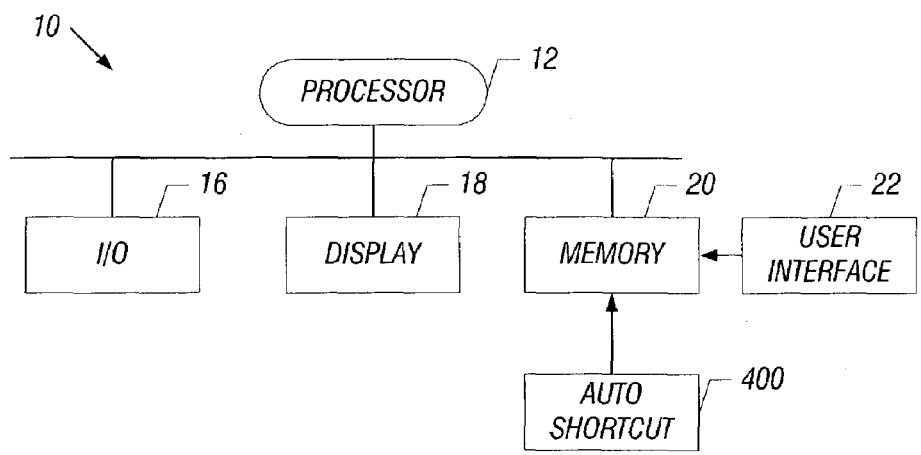
FIG. 1 is a schematic depiction of a system according to an embodiment of the present invention.

Referring to FIG. 1, a processor-based system 10 may include a processor 12 coupled over a bus 14 to an input/output device 16, a display 18, and a memory 20. In one embodiment, the input/output device 16 may be any device that allows the user to make selections from a user interface 22 that may be stored in the memory 20.

The system 10 may be any processor-based system, including a desktop computer, a laptop computer, a hand held computer, a cellular telephone, a digital camera, or set top box, to mention a few examples. The architecture shown in FIG. 1 is illustrative only and is not in any way intended to be limiting on the scope of the present invention.

The user interface 22 may be a graphical user interface that displays text or symbols to enable the user to make selections of user selectable options. In accordance with one embodiment of the present invention, a hierarchical data structure may be stored so as to be accessed through the user interface 22. In one embodiment, the hierarchical data structure may enable access to data or files. In one embodiment, a specific file or piece of data may be the lowest level of the hierarchy. A group of files or data that are related in some aspect, may compose the next level. The next level may be groups of those files or data and so on until the highest level or root level of the hierarchy is reached.

Generally, a user may use the input/output device 16 to make selections from the user interface 22 so as to navigate from the upper level of the hierarchy through to the lowest level to access the actual data or files that the user may wish to retrieve. For example referring to FIG. 2, an upper level hierarchy may be represented by a user interface 22a, including a user selectable option 24, which enables the user to select from among levels in a file system for network files. Under the upper hierarchy 24 for "network places" are selectable interfaces 24a for the desktop, 24b for network places, and 24c for recycling. The interface 22a, in one embodiment, may be consistent with the Windows operating system available from Microsoft Corporation.

Under the user selectable interface 24a for the desktop are the next level of interfaces 26a, 26b for "documents" and "computer." Under the next lower level 26b for "computer" are interfaces 28a, 28b, and 28c to access the next sublevel of the system.

Thus, in some embodiments, a portion of a hierarchical file or data storage system may be represented by the user interface 22, enabling the user to select from among different levels of the files through convenient user interfaces. The highest level in this example is represented by the interface 24, the next level is represented by the interface 26, and the next lower level is represented by the interface 28 in one example. Of course, in some cases, higher level interfaces and files may be provided and a large number of lower levels may be provided.

Figure 2:
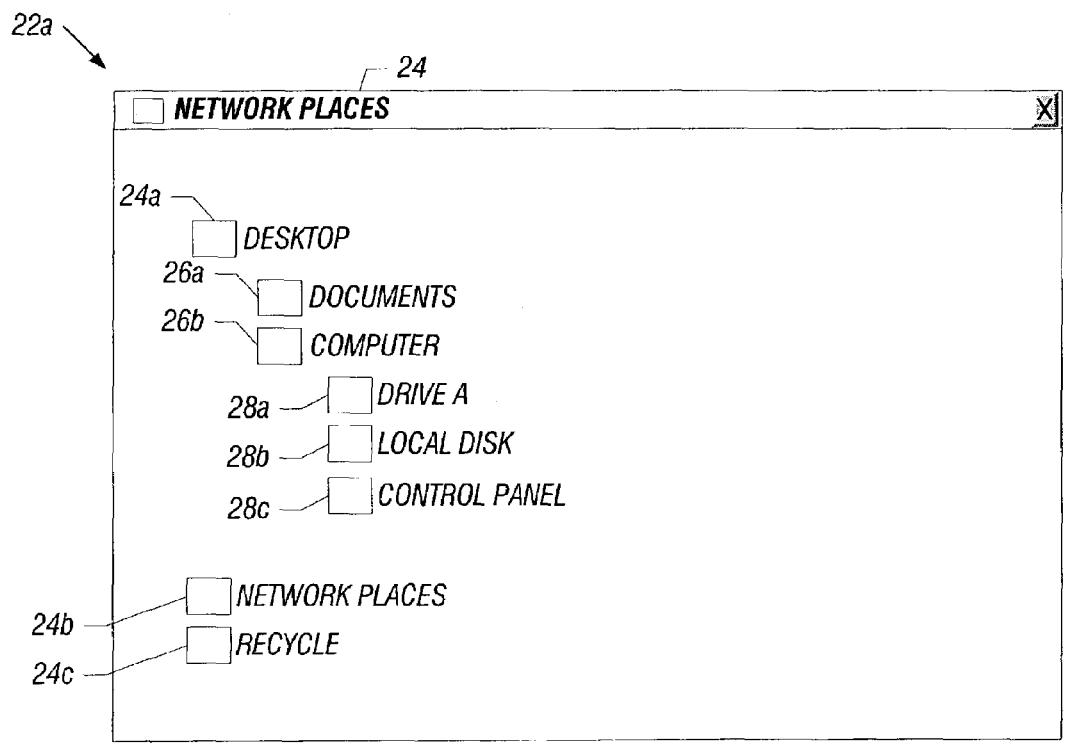
FIG. 2 is an upper level of a user interface in accordance with one embodiment of the present invention.
Figure 3:
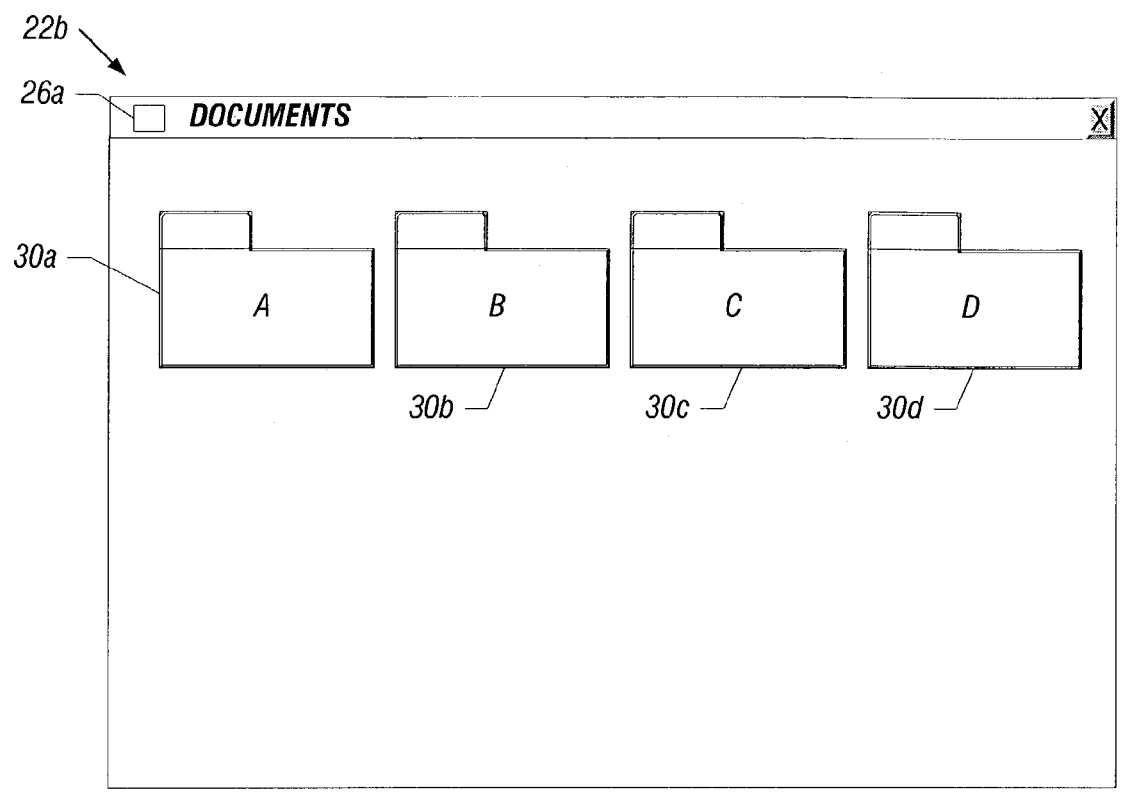
FIG. 3 is a lower level of a user interface in accordance with one embodiment of the present invention.

As an illustration, when the user selects the document interface 26a in FIG. 2, the interface 22b, shown in FIG. 3, may be displayed that is a lower level in this hierarchy, represented by folder interfaces 30a, 30b, 30c, and 30d. Each of the folder interfaces 30 are user selectable so that when the user selects these interfaces 30, one or more specific documents (in this example) may subsequently be made available for user selection using the document interfaces 32a and 32b in FIG. 4.

Figure 4:
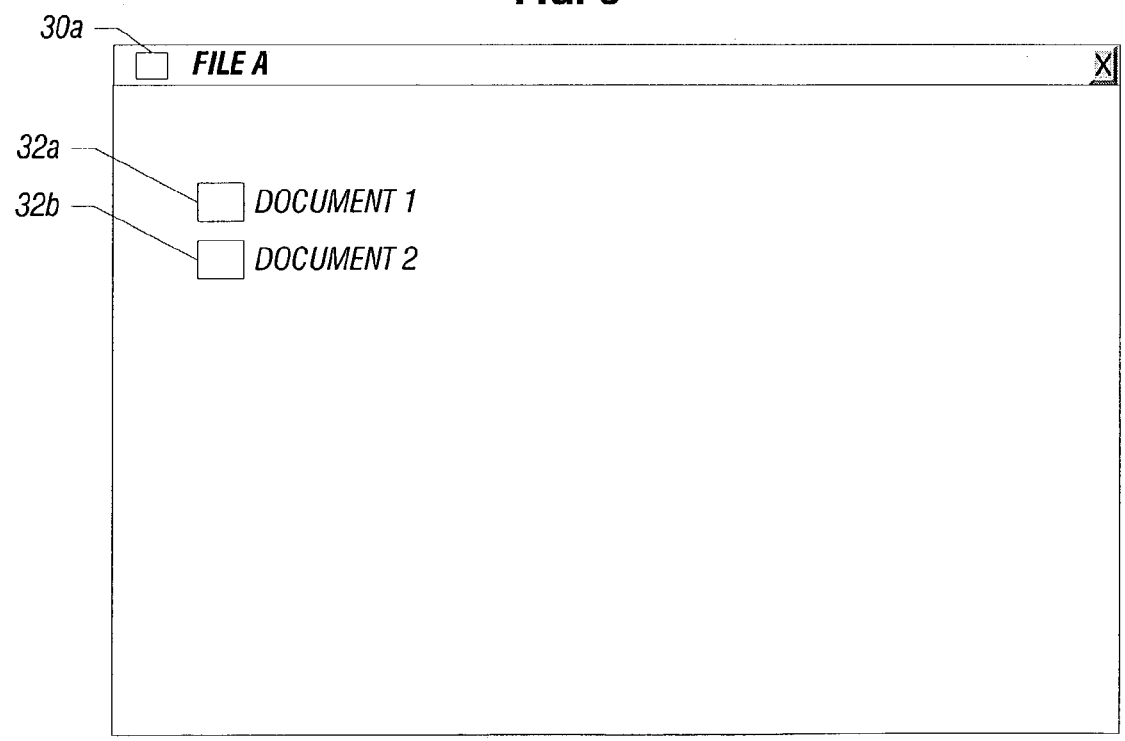
FIG. 4 is a lower level of a user interface in accordance with one embodiment of the present invention.

In many cases, the selection of the various interfaces shown in FIGS. 2-4 may be accomplished using an input/output device 16, such as a mouse. The user may select a given interface by positioning a mouse cursor over the interface, and operating the input/output device 16 to select the desired level within the file or data hierarchy.

Figure 5:
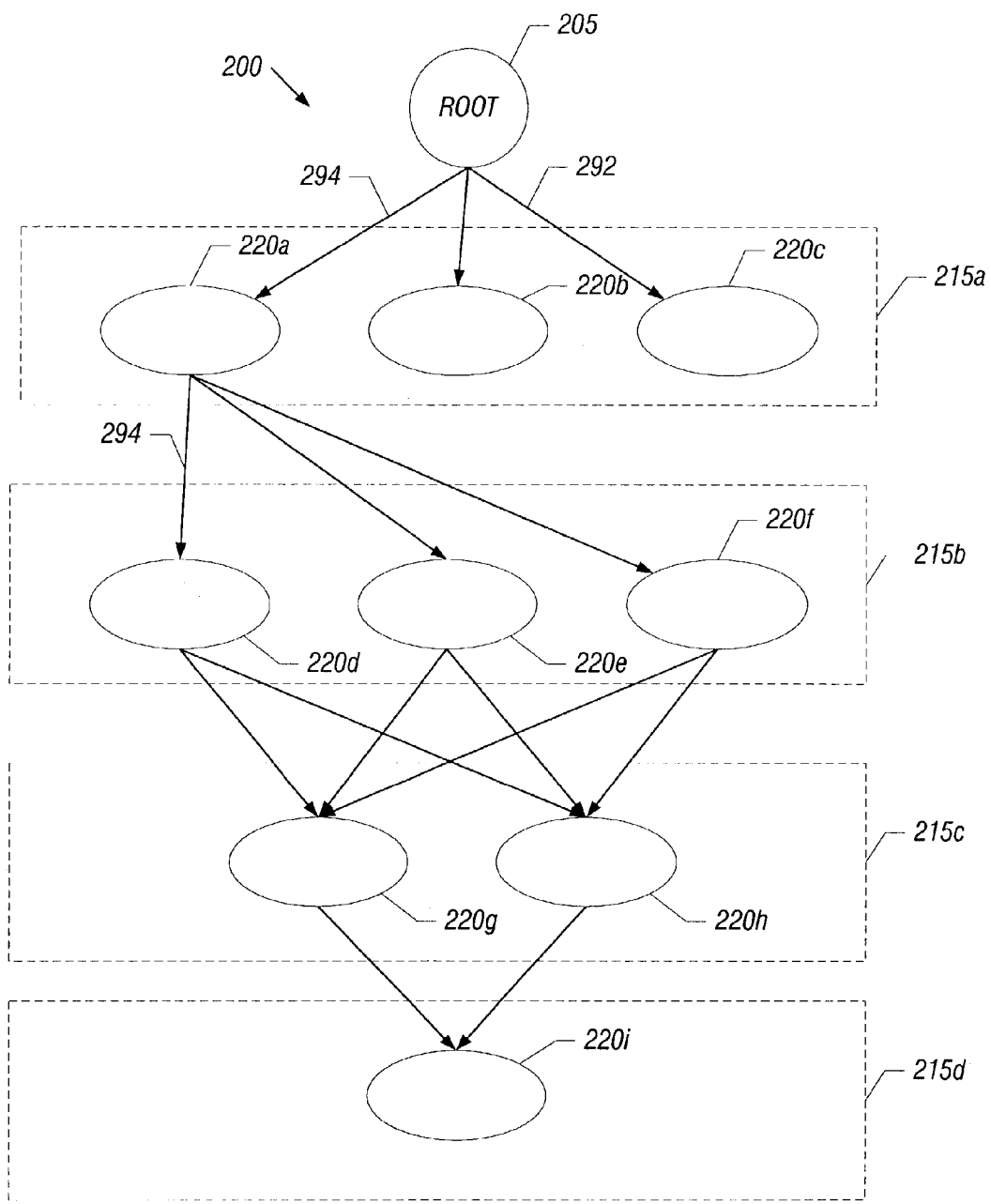
FIG. 5 is a schematic depiction of a data structure according to an embodiment of the present invention.

The data or file hierarchy accessible by interfaces, such as the interfaces 22a and 22b, may be represented by a tree depiction as illustrated in FIG. 5. The root 205 may be associated in one example with the user selectable interface 24. The next lower level in the hierarchy, the level 215a, may be selectable by, for example, using the user interface 26a, the next level 215b may be, for example, represented by the interface 26a, the next level 215c may correspond to interface 30, and the next lower level 215a may be represented by an interface 30 in accordance with one embodiment of the present invention.

As depicted in FIG. 5, the level 215a may include a number of items of files or data indicated as 220a-c. These data or files 220 may, in turn, be represented by user selectable interfaces. For example, the root level 205 may be represented as the user interface 24 and may correspond to the highest level of a particular processor-based system 10. When the user selects "network places" interface 24, interfaces representing the items 220a through 220c may be displayed. These interfaces may correspond to the icons such as user selectable interfaces 24a-24c. In the next level 215b, a plurality of files 220d-220f may correspond to files accessible by selecting the interface 24a and may include the interfaces 26a and 26b among others. The next level 215c may represent selections from, for example, the interface 26a as depicted in FIG. 3, and the next level 215d may correspond to the interfaces selectable through the interface shown in FIG. 4.

Thus, a user can proceed from the root level 205 to, for example, the item 220a in the level 215a. As indicated by arrows, having selected the item 220a at the level 215a, the user can select from among the items 220d-220f at the level 215b, as indicated by the arrows. The user can then select from among the items at the level 215b to items 220g and 220h at the level 215c and from that level, the user can select an item 220i at the level 215d, in one embodiment of the present invention. Of course, the hierarchy shown in FIG. 5 is merely an example of one potential hierarchy in accordance with one embodiment of the present invention and a wide variety of other hierarchies are also possible.

Thus, in order to access the item 220i, the user must traverse through the root level 205 and the levels 215a-215c to get to level 215d. In one embodiment, this involves a number of user selections of user interfaces associated with those levels in order to ultimately reach the intended destination item 220i. This traversing or navigating through the different levels of interfaces associated with the different levels of the data structure hierarchy may be time consuming. Particularly where the user repeatedly selects the item 220i, the user may waste a lot of time navigating through the hierarchy structure. For example, in some cases, the item 220i may be accessed much more frequently than any of the items in levels above the level 215d associated with the item 220i.

While it is possible to create a shortcut that may be represented by the user interface that may be accessible at the root level or other higher levels, doing so involves additional expenditure of user time to create the interface. Moreover, the user must know of the capability of doing such a shortcut and most know how to do so. Advantageously, this effort may be automated in accordance with one embodiment of the present invention.

Figure 6:
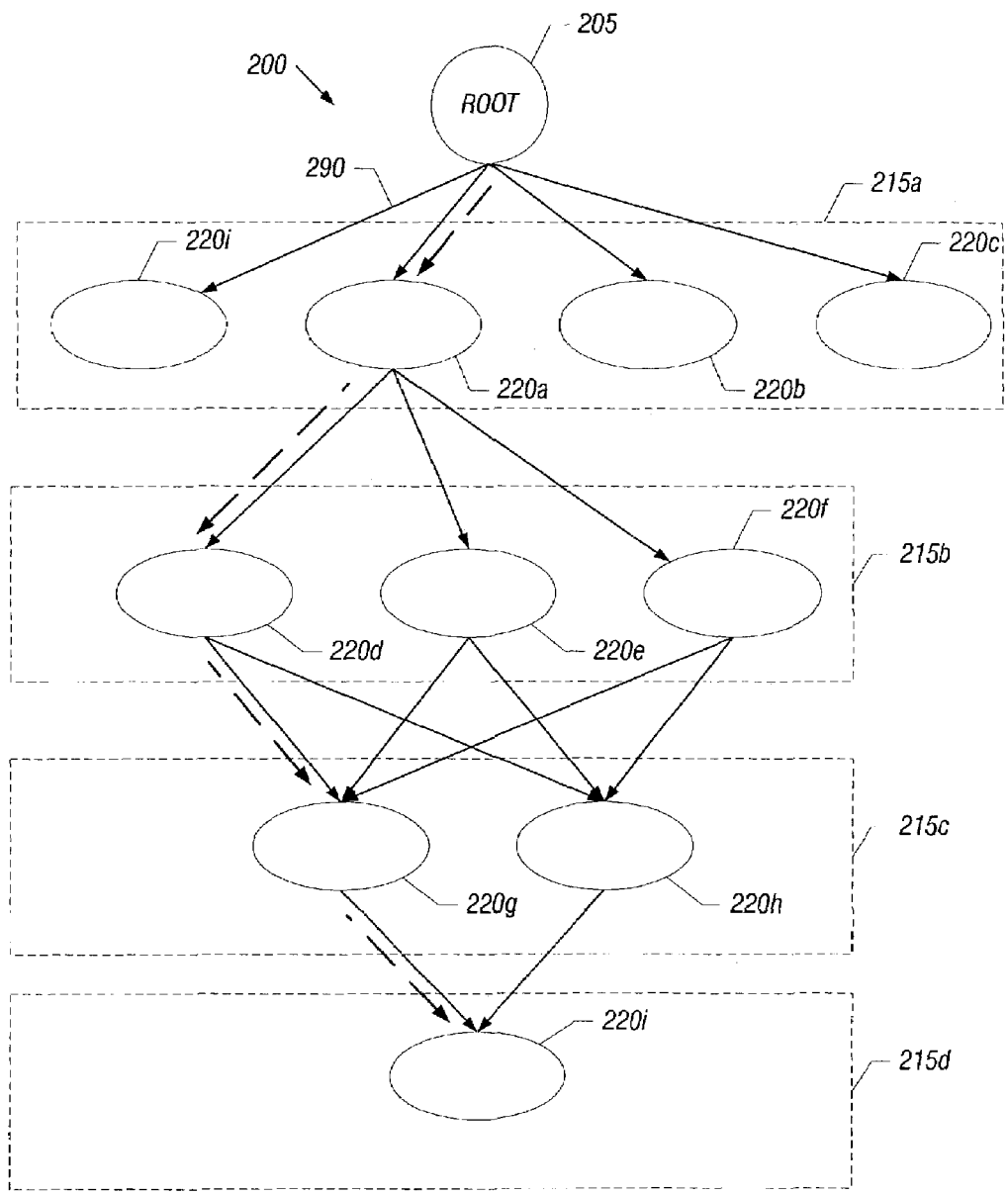
FIG. 6 is a schematic depiction of a data structure after implementation of the software of FIG. 4 according to an embodiment of the present invention.

Referring to FIG. 6, a more direct path 290 to item 220i may be automatically generated, meaning that the more direct path may be generated without requiring any action by a user. Generation of the more direct path may include enabling an item 220i to be accessed at a higher level of the hierarchical structure 200 than the level at which the item was located before the more direct path was automatically generated. For example, in FIG. 6, the more direct path may extend from the root level 205 to item 220i at level 215a. Before generation of the more direct path, item 220i may have only been accessible by navigating from the root level 205 through the levels 215a, 215b, and 215c to item 220i at level 215d.

Figure 7:
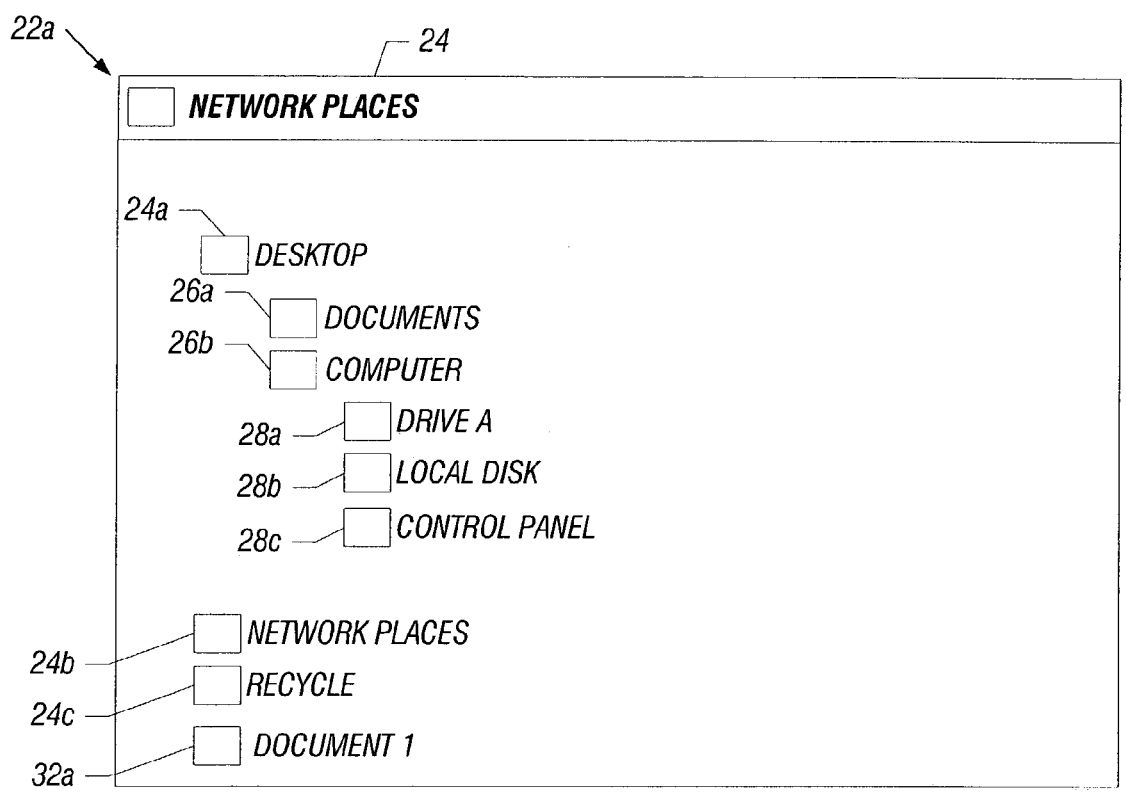
FIG. 7 shows a user interface in accordance with one embodiment of the present invention.

Thus, a user interface 32a may become accessible at the level 215a, represented by the interface 22a, shown in FIG. 7, because the item 220i, represented by the interface 32a was frequently accessed. As a result, quicker and more direct access to the item 220i is automatically enabled in one embodiment of the present invention.

A Bayesian network algorithm may be used to determine whether to generate a more direct path 290 to an item 220. A Bayesian network algorithm may determine a higher level 215 for the path 290. In some embodiments, whether a more direct path is generated may depend on the number of times the item is accessed. The more times that an item is accessed generally indicates a greater likelihood that a more direct path will be generated. For example, if the number of times an item is accessed exceeds a predetermined value, a more direct path may be generated. If the number exceeds a second value, an even more direct path may be generated, but if the number exceeds a third value a still more direct path may be generated. The more direct path may depend on the number of times the item is accessed alone or in combination with other factors.

In some embodiments, the automatic generation of more direct path may further depend on characteristics of a path through which the item may be accessed. For example, a more direct path to an item may be more likely to be generated if the current path through which the item may be accessed requires a user to access more items than would be used to access another item in the hierarchical structure 200 which is not accessed any more frequently. For instance, in FIG. 5, a first path 292 may extend from the root level 205 to item 220c in level 215a. The first path 292 may require a user to access an interface associated with the root level 205 and the second interface associated with the item 220c at the level 215a. A second path 294 may extend from the root level 205 to item 220a and from item 220a to item 220d. The second path 294 may require a user to access three interfaces associated with an item at the root level 205, an item 220a, and item 220d. In this example, a more direct path may be more likely to be generated to item 220d than to item 220c even if each item were accessed the same number of times. This is because the user accesses one more interface in the second path 294 from the root level 205 to item 220d than in the first path 292 from the root level to item 220c.

In some embodiments, a more direct path may be more likely to be generated to an item if the number of interfaces through which a user must search in a particular level before finding the item is greater than the number of interfaces through which a user must search in a level to find another not more frequently accessed item. For example, the root level 205 may provide access to a particular point in level 215a, and level 215a may provide access to a particular point in level 215b. In such a case, a user may begin searching from the points in levels 215a and 215b which provide access to levels 215a and 215b, respectively. For instance, in FIG. 5, if access is provided only from left to right to the items in level 215a, then a user must search through three items in level 215a to find item 220c. The user must search through one item in level 215b to find item 220d. In this example, a more direct path may be more likely to be generated to item 220c than to item 220d given the same numbers of access, because the user must search through two more items to find item 220c in level 215a than to find item 220d in level 215b.

The hierarchical structure 200 may be described mathematically as a directed acyclic graph ("DAG"), represented by the equation $G=\{V,E\}$. In the equation, V may be an item, and E may be an edge, or a path from one item to another. A directed edge, e ∈ E, from a first item to a second item may represent that the second item may be accessed from the first item. For example, a directed edge from item 220*d* to item 220*g* may represent that item 220*g* may be accessed from item 220*d*. In this case, item 220*d* may be called the parent of item 220*g*. Items at the root level 205 are generally the only items without a parent.

Figure 8:
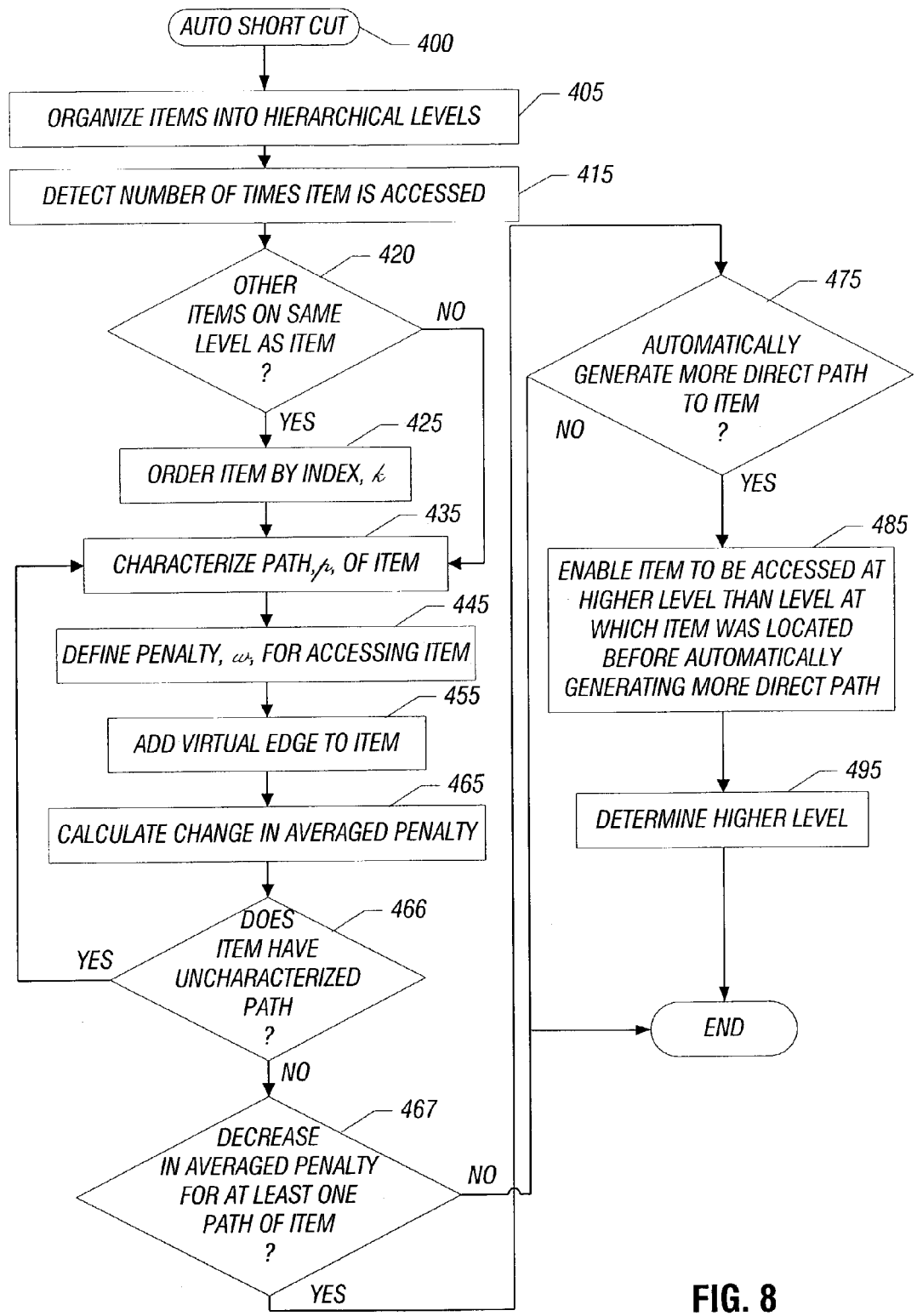
FIG. 8 is a flow chart for software that may be utilized by the system shown in FIG. 4 according to an embodiment of the present invention.

In accordance with one embodiment of the present invention, software 400 for automatically generating shortcuts based, at least in part, on the number of times that a particular item in the hierarchy is accessed may be stored on the memory 20 (FIG. 1). The auto shortcut software 400, as indicated in FIG. 8, begins by organizing items in the hierarchy into hierarchical levels as indicated at block 405. The number of times an item is accessed may be detected at block 415. Items 220 that are on the same level 215, as determined at diamond 420, and have a common parent, may be ordered at block 425 by an index, $i$. For example, in FIG. 6, items 220*d*, 220*e*, and 220*f* are on the same level 215*b* and may be ordered by indices $i_d=1$, $i_e=2$, and $i_f=3$, respectively. A particular item may be characterized by a path, as indicated at block 435. In some embodiments, the path may equal the number of items 220 through which a user may navigate from the root level 205 to the particular item 220. For example, in FIG. 6, item 220*d* may be characterized by $p_d=3$, because a user may navigate through an item in the root level 205 and item 220*a* before finding item 220*d*, a total of three items.

A penalty, $w>0$, may be defined at block 445 for accessing a particular item in the hierarchical structure 200. For example, a binary variable, $y$, may be defined to equal 1 if and only if a particular item has been accessed. The different paths through which a user may navigate to access a particular item may be coded by a sequence of binary variables, $y$, for the items in the structure 200. The penalty of the path may be defined as a sum of penalties for individual items 220. For example, in FIG. 6, item 220*d* may be accessed by only one path, and the penalty of that path may be defined as $w = \Sigma w_d y_d$.

The variable $w_d$ may be application-dependent. For example, if a personal computer graphical user interface is employed, $w_d$ may increase with the number of items on the same level 215 as item 220*d*, because it may be difficult for a user to find the desired item in a long list. In some embodiments, only some of the items on the same level may be displayed at the same time due to a display screen size limitations, for example. Thus, $w_d$ may be dependent on the ordered index, $i$, of the item in the level, because the user may spend time scrolling through other items before finding the desired item. The ordered index, $i$, may be taken into account, for example, by inserting a shortcut into an index and computing the impact on $M[w]$.

Access statistics for an item 220*d* may be collected. For example, the probability $p_d = P(y_d=1)$ for binary variable $y_d$ to be equal to 1 may be calculated. Moreover, the probability $P(y_d=1|\{y_a\}_{a=parents(d)})$ that a user may access item 220*d* from each of its parent items may be calculated.

A search for a change that decreases the averaged penalty, $M[w]$, may be performed. A change may include adding an edge or reordering items on the same level, for example. In some embodiments, a virtual edge may be added at block 455 to a frequently visited item. In some embodiments, the search may be performed in the background, while other operations are being performed in the foreground. In some embodiments, the number of tests for adding edges in a branch of the structure 200 may be proportional to a squared number of items in that branch. The number of reordering tests may be exponentially related to the number of items on the same level 245 in some embodiments.

In some embodiments, the change in the averaged penalty may be calculated at block 465 according to the equation $M[w] = w_a M[y_a]$. The change in averaged penalty may be expressed in closed form, for example, if the graph does not contain cycles. If, on the contrary, at least one item has multiple parents, the change of $M[w]$ may be calculated using a junction tree inference. Paths of an item 220*d* that have not been characterized, as determined at diamond 466, may be characterized at block 435. After all paths of an item 220*d* have been characterized, as determined at diamond 466, a determination may be made at diamond 467 as to whether the averaged penalty, $M[w]$, may be decreased for at least one path of the item 220*d*. For a change that decreases $M[w]$, as determined at diamond 467, a decision may be made whether to automatically generate a more direct path to the item as indicated at diamond 475.

An item may be enabled, as indicated at block 485, to be accessed at a higher level than a level at which the item was located before automatically generating a more direct path. A Bayesian network algorithm may be used to determine the higher level as indicated at block 475. Although memory may be limited, many statistics may be stored in a Bayesian network as a prior distribution, which may encode the information. In some embodiments, memory space required for this technique may depend on the size of the hierarchical structure 200, rather than the size of the database.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   detecting a number of times an item is accessed;
   automatically generating a more direct path to the item based at least in part on how often the item is accessed; and
   providing a more direct path to an item based on the number of times it is accessed and the number of interfaces that must be used in order to access said item.

2. The method of claim 1 including enabling a plurality of user accessible items to be arranged in a hierarchy and providing graphical user interfaces which may be successively displayed to enable the user to make selections from within the hierarchy.

3. The method of claim 2 wherein based at least in part on the number of times an item is accessed, its position within the hierarchy may be modified and its location within the user interfaces may be modified in order to enable the item to be accessed at a higher level in the hierarchy.

4. The method of claim 1 including generating a more direct path further based at least in part on an index of the item.

5. The method of claim 1 including generating a more direct path further based at least in part on the manner in which the item is accessed.

6. The method of claim 1 further including organizing items into hierarchical levels, and automatically generating the more direct path includes enabling an item to be accessed at a higher level than a level at which the item was located before automatically generating the more direct path.

7. The method of claim 6 further including using a Bayesian network algorithm to determine the higher level.

8. The method of claim 1 including enabling an item to be more easily accessed based on the number of times it has been accessed in the past and a characteristic of the actions needed to access the item.

9. The method of claim 1 including providing a plurality of graphical user interfaces to enable a hierarchy of user accessible items to be accessed and automatically modifying said user interfaces based on the number of times a particular item is accessed.

10. An article comprising a medium storing instructions that, if executed, enable a processor-based system to:
   detect a number of times an item is accessed;
   automatically generate a more direct path to the item based at least in part on how often the item is accessed; and
   enable an item to be more easily accessed based on the number of times it has been accessed in the past and a characteristic of the actions needed to access the item.

11. The article of claim 10 further storing instructions that, if executed, enable the system to enable a plurality of user accessible items to be arranged in a hierarchy and to provide graphical user interfaces which may be successively displayed to enable the user to make selections from within the hierarchy.

12. The article of claim 11 wherein based at least in part on the number of times an item is accessed, its position within the hierarchy may be modified and its location within the user interfaces may be modified in order to enable the item to be accessed at a higher level in the hierarchy.

13. The article of claim 10 further storing instructions that, if executed, enable the system to generate a more direct path based at least in part on an index of the item.

14. The article of claim 10 further storing instructions that, if executed, enable the system to generate a more direct path based at least in part on the manner in which the item is accessed.

15. The article of claim 10 further storing instructions that, if executed, enable the system to organize items into hierarchical levels, and automatically generating the more direct path includes enabling an item to be accessed at a higher level than a level at which the item was located before automatically generating the more direct path.

16. The article of claim 15 further storing instructions that, if executed, enable the system to use a Bayesian network algorithm to determine the higher level.

17. The article of claim 10 further storing instructions that, if executed, enable the system to provide a more direct path to an item based on the number of times it is accessed and the number of interfaces that must be used in order to access said item.

18. The article of claim 10 further storing instructions that, if executed, enable the system to provide a plurality of graphical user interfaces to enable a hierarchy of user accessible items to be accessed, and to automatically modify said user interfaces based on the number of times a particular item is accessed.

19. A system comprising:
   a processor-based device; and
   a storage coupled to said device storing instructions that, if executed, enable the processor-based device to detect a number of times an item is accessed, automatically generate a more direct path to the item based at least in part on how often the item is accessed, and provide a more direct path to an item based on the number of times it is accessed and the number of interfaces that must be used in order to access said item.

20. The system of claim 19 further storing instructions that, if executed, enable the processor-based device to enable a plurality of user accessible items to be arranged in a hierarchy and to provide graphical user interfaces which may be successively displayed to enable the user to make selections from within the hierarchy.

21. The system of claim 20 wherein based at least in part on the number of times an item is accessed, its position within the hierarchy may be modified and its location within the user interfaces may be modified in order to enable the item to be accessed at a higher level in the hierarchy.

22. The system of claim 19 wherein the more direct path is further based at least in part on an Index of the item.

23. The system of claim 19 wherein the more direct path is further based at least in part on the manner in which the item is accessed.

24. The system of claim 19 further storing instructions that, if executed, enable the processor-based device to organize items into hierarchical levels, and automatically generating the more direct path includes enabling an item to be accessed at a higher level than a level at which the item was located before automatically generating the more direct path.

25. The system of claim 24 further storing instructions that, if executed, enable the processor-based device to use a Bayesian network algorithm to determine the higher level.

26. The system of claim 19 further storing instructions that, if executed, enable the processor-based device to enable an item to be more easily accessed based on the number of times it has been accessed in the past and a characteristic of the actions needed to access the item.

27. The system of claim 19 further storing instructions that, if executed, enable the processor-based device to provide a plurality of graphical user interfaces to enable a hierarchy of user accessible items to be accessed, and to automatically modify said user interfaces based on the number of times a particular item is accessed.

* * * * *